United States Patent Office 3,651,023
Patented Mar. 21, 1972

3,651,023
PREPARATION OF POLYAMIDES WITH SPECIAL PROPERTIES
Johannes H. Ottenheym, Sittard, and Pieter C. A. Van Krimpen and Pierre J. Franssen, Stein, Netherlands, assignors to Stamicarbon N.V., Heerlen, Netherlands
No Drawing. Filed July 2, 1968, Ser. No. 741,897
Int. Cl. C08g 20/08, 20/12, 41/00
U.S. Cl. 260—78 L
1 Claim

ABSTRACT OF THE DISCLOSURE

There is provided a polyamide composition containing at least one additive of lysine, α-amino-ε-caprolactam, ε-N—R-lysine (wherein R stands for a bivalent hydrocarbon radical), α-N—R-α-amino-ε-caprolactam (wherein R stands for a bivalent hydrocarbon radical), N,N'-bis hexahydro-azepin-2-oxo-3-yl)-R (wherein R stands for a diamine or a diamide) and 1 N, 3 N, 5 N-tri(hexahydro-azepin-2-oxo-3-yl)-triazine-1,3,5 and a process for producing the same. Preferably the additive is contained in the composition in amounts of 0.5 to 5% by weight of the polyamide. The composition is useful for spinning into fibers and yarns and improves color intensity, modulus of elasticity and flat spotting.

The invention relates to the preparation of polyamide compositions which have novel and valuable properties.

It is known that the properties of polyamides can be affected by adding to the polyamides or to polyamide-forming compound various substance, in regard to the properties to be affected. For instance, certain substances may be added to polyamides to allow homogeneously mixing of the polyamides with materials which would not otherwise mix therethrough, e.g., delusterants, for polyamides. Pigments, stabilizers and antioxidants are also added to polyamides.

However, as is known in the art, when foreign substances are added to polyamides, the relative viscosity is often adversely affected and results in compositions that are either ill-suited for or impossible to spin into yarns and the like. Accordingly, the choice of additives for affecting certain properties in a desired way is, from a practical sense, restricted to additives which do not adversely affect the relative viscosity of the polyamide composition and allow successfully spinning thereof. In this regard, it has been a difficult problem in the art to find additives which will improve the physical properties of polyamides without adversely affecting the relative viscosity and, hence, the ability to spin the polyamides into fibers, yarns and the like. Furthermore, when the fibers or yarns are intended to be used in textile products which must be dyed, it is necessary that any additives not adversely effect the resulting color intensity, i.e., resulting in a bland or lifeless color.

It is therefore an object of the present invention to provide polyamide compositions which will produce fibers and yarns with improved physical properties and color intensity of the dyed fibers and yarns. It is a more specific object to improve the flat-spot index and modulus of elasticity of such yarns. It is a further object to provide process for the production of such compositions and yarns.

It has now been found that the above objects may be obtained if at least one member of the group consisting of lysine, α-amino-ε-caprolactam, ε-N—R-lysine (wherein R stands for a bivalent hydrocarbon radical), α-N—R-α-amino-ε-caprolactam (wherein R stands for a bivalent hydrocarbon radical), N,N'-bis(hexahydro-azepin-2-oxo-3-yl)-R (wherein R stands for a diamine or a diamide and 1 N, 3 N, 5 N-tri(hexahydro-azepin-2-oxo-3-yl)-triazine-1,3,5 is added and mixed with a polyamide or a polyamide-forming compound before or during its polymerization. However, since very intimate mixing is obtained if the additive is placed in the composition prior to polymerization, this is the preferred embodiment. Nevertheless, the additive may be satisfactorily mixed with the polymerized polyamide.

By the term polyamide is meant those polymers known to the art which are long-chain synthetic polymeric amides which have recurring amide groups as an integral part of the main polymer chain and which are capable of being formed into a filament, and included polymerized lactams, condensation products of a diamine and a dibasic acid and self-condensing amino acids. Representative of the polyamides are the caprolactam polymers, e.g., nylon 6, and the diamine/dibasic acid condensates, e.g., nylon 6, 6 and 6, 10 and mixtures of nylon 6 and nylon 12.

The substances, other than lysine and α-amino-ε-caprolactam, used as additives according to the invention belong to the general class of Schiff's bases and can be prepared by the well known methods of preparing Schiff's bases as for example described in Houben Weyl, Methoden der Organischen Chemie, vol. 11, part 2, pp. 77 and 78 (1958).

Examples of these additives are

ε-N-methylene-lysine,
α-N-methylene-α-amino-ε-caprolactam,
N,N'-bis(hexahydro-azepin-2-oxo-3-yl)-metthylene diamine,
N,N'-bis(hexahydro-azepin-2-oxo-3-yl)-methylene diamine,
N,N'-bis(hexahydro-azepin-2-oxo-3-yl)-succinic acid diamine and mixtures thereof.

Small amounts of the additive according to the inveniton, e.g. 0.5 to 5% by weight with respect to the polyamide are suitable to obtain polyamides with the above-noted properties. With such small amounts of the additives, polyamides are obtained which can be spun into filaments by the methods commonly used in the art.

By adding larger amounts of the abovementioned additives to polyamides or polyamide-forming compounds, e.g. 5% to 50%, modified polyamides, e.g. polyamides of laurolactam or lactam mixtures, are obtained from which shaped objects can be made and as such constitutes a further feature of the invention.

The invention is illustrated by the following examples, but the invention is not limited thereto.

EXAMPLES 1–8

In a manner known to the art, a series of polyamides were prepared by polymerizing ε-caprolactam which had been mixed with an additive according to the invention. In addition, 4% by weight of water, and some cases 0.015% by weight of acetic acid was added to promote the polymerization reaction. The polyamide-forming compound was heated to a temperature of 260° C. at atmospheric pressure for 16 hours while blanketed in a nitrogen atmosphere.

Subsequently, the polyamide was extruded into filaments in a known manner using a conventional spinnerette. The filaments were washed with methanol, and the viscosity was subsequently measured.

The results of the experiments are shown in the Table 1 below.

The additives in the Table 1 indicated by A, B, C, D and E are:

additive A: N,N'-bis(hexahydro-azepin-2-oxo-3-yl)-para-xylylene diamine additive B: N,N'-bis(hexahydro-azepin-2-oxo-3-yl)-succinic acid diamide additive C: a mixture of about equal amounts by weight of α-N-methylene-α - amino-ε-caprolactam N,N'-bis (hexahydro-azepin-2-oxo-3-yl)-methylene diamine and 1 N, 3 N, 5 N-tri(hexahydro-azepin-2-oxo-3-yl)-triazine-1,3,5 additive D: ε-N-methylene-lysine additive E: α-amino-ε-caprolactam.

In the table, η-rel. indicates the relative viscosity, which is the ratio between the viscosity of a solution of 1 g. of the polyamide in 100 ml. of sulphuric acid (96% by weight) at 20° C. and the viscosity of the sulphuric acid.

TABLE 1

| | Additive (percent wt.) | Water (percent wt.) | Acetic acid (percent wt.) | η-rel. |
|---|---|---|---|---|
| Control: | | | | |
| 1 | | 4 | | 2.7 |
| 2 | | 4 | 0.015 | 2.4 |
| Example No.: | | | | |
| 1 | 1% of lysine | 4 | | 2.6 |
| 2 | 5% of lysine | 4 | | |
| 3 | 1% of A | 4 | 0.015 | 2.7 |
| 4 | 3% of A | 4 | 0.015 | 3.6 |
| 5 | 1% of B | 4 | 9.015 | 2.6 |
| 6 | 2% of C | 4 | 0.015 | 2.8 |
| 7 | 1% of D | 4 | 0.015 | 2.8 |
| 8 | 1% of E | 4 | | 2.6 |

The viscosity values show that polyamides have been obtained which can be spun into filaments. The polyamide obtained in Example 2 with 5% lysine added does not dissolve in sulphuric acid, and the molten product is so easy flowable that spinning is impossible.

The polyamides obtained were used in conventional dying processes and it was found that the color intensity of the polyamide filaments obtained in accordance with the invention was much greater than that of blank or control products without the present additives. Accordingly, the improved dyeability and the color intensity can be used to advantage in producing special tone—in tone effects in polyamide—containing fabrics.

EXAMPLES 9–12

Caprolactam was polymerized in an autoclave at a temperature of 260° C. and at a pressure of 5–6 atm., under a nitrogen atmosphere for 3 hours. The pressure was released to 1 atm. by discharging the gaseous products, after which further heating at 260° C. was continued for an additional 3 hours. The product obtained was extruded to filaments with a conventional spinneret. After these filaments were washed with methanol, the viscosity was determined.

Similarly to Examples 1–8, prior to the polymerization of lactam lysine was added along with 14.7 mole percent of water and in some cases 0.15 mole percent of acetic acid, as indicated in Table 2.

The relative viscosity of the polyamide products is shown below.

TABLE 2

| | Additive (percent wt.) | Acetic acid (mole percent) | η-rel. |
|---|---|---|---|
| Example No.: | | | |
| 9 | 0.7% lysine | .15 | 2.8 |
| 10 | 1% lysine | .15 | 2.9 |
| 11 | 2% lysine | | 3.1 |
| 12 | 3% lysine | | 2.9 |

The polyamide obtained with 1% by weight of lysine therein (Example 10) has the following mechanical properties:

tensile strength—7.5–9 (8–9) g./denier
elongation at break—15–17% (14–15%)
modulus of elasticity—55–65 (45–55)
flat-spot index—1.2–1.4 (2.0–2.3) mm.

The values placed in brackets are those obtained with the blank or control products, to which no lysine was added.

The flat-spot index is determined by subjecting a bundle of filaments composed of 1680-denier material to a standard schedule of loading at a temperature of 23.9° C. and a relative humidity of the air of 55%. At its lower end, the freely suspended bundle (length 50 cm.) is loaded with 1.362 kg. for ½ hour, after which the length (a) is measured. The load is then decreased by 0.908 kg., whereby the remaining load is 0.454 kg. The filaments are subjected to this reduced load for 2 hours.

Subsequently, the load is again increased to 1.362 kg. and after 12 seconds the length (b) is measured.

The difference in length between (a) and (b) is called the flat-spot index and is expressed in millimeter.

The flat-spot index value is of importance if the polyamides are to be used in the manufacture of fabrics which are placed under stress, e.g., car tire fabrics and yarns. For this type of application, the flat-spot index should be as low as possible.

From the value shown above it can be seen that a reduction of the flat-spot index has been achieved, while, furthermore, the modulus of elasticity has been improved.

It will be apparent to those skilled in the art that various modifications of the present invention may be made without departing from the invention. These modifications are intended to be included in the invention and the invention is limited only by the spirit and scope of the following claim.

What is claimed is:

1. A polyamide having improved color intensity, modulus of elasticity, flat spotting and which may be spun into fibers and yarns, wherein the polyamide is selected from the group consisting of nylon 6, nylon 6, 6, nylon 6, 10, and mixtures of nylon 6 and nylon 12 and has been polymerized in the presence of an additive selected from the group consisting of lysine, α-amino-ε-caprolactam, ε-N-methylenelysine, α-N-methylene-α- amino-ε-caprolactam, N,N-bis(hexahydro-azepin - 2 - oxo-3-yl) methylene diamine, N,N'-bis(hexahydro-azepin - 2 - oxo - 3 - yl)-paraxylylene diamine, N,N'-bis(hexahydro-azepin-2-oxo-3-yl) succinic acid diamide and 1 N, 3 N, 5 N-tri(hexahydro-azepin-2-oxo-3-yl)-triazine-1,3,5, wherein said additive is contained in an amount of from 0.5% to 5% by weight of the polyamide.

References Cited

UNITED STATES PATENTS

| 2,289,775 | 7/1942 | Graves | 260—78 L |
| 3,052,655 | 9/1962 | Fox et al. | 260—78 TF |
| 3,076,790 | 2/1963 | Fox et al. | 260—78 TF |
| 3,215,684 | 11/1965 | Strojny et al. | 260—78 TF |
| 2,892,817 | 6/1959 | Ham | 260—78 A |

WILLIAM H. SHORT, Primary Examiner

L. M. PHYNES, Assistant Examiner

U.S. Cl. X.R.

260—78 TF, 857; 264—176 F, 211